(No Model.)　　　　　　　G. G. SEEGER.　　　　　2 Sheets—Sheet 1.
DRAG SAW.
No. 288,264.　　　　　　　　　　Patented Nov. 13, 1883.
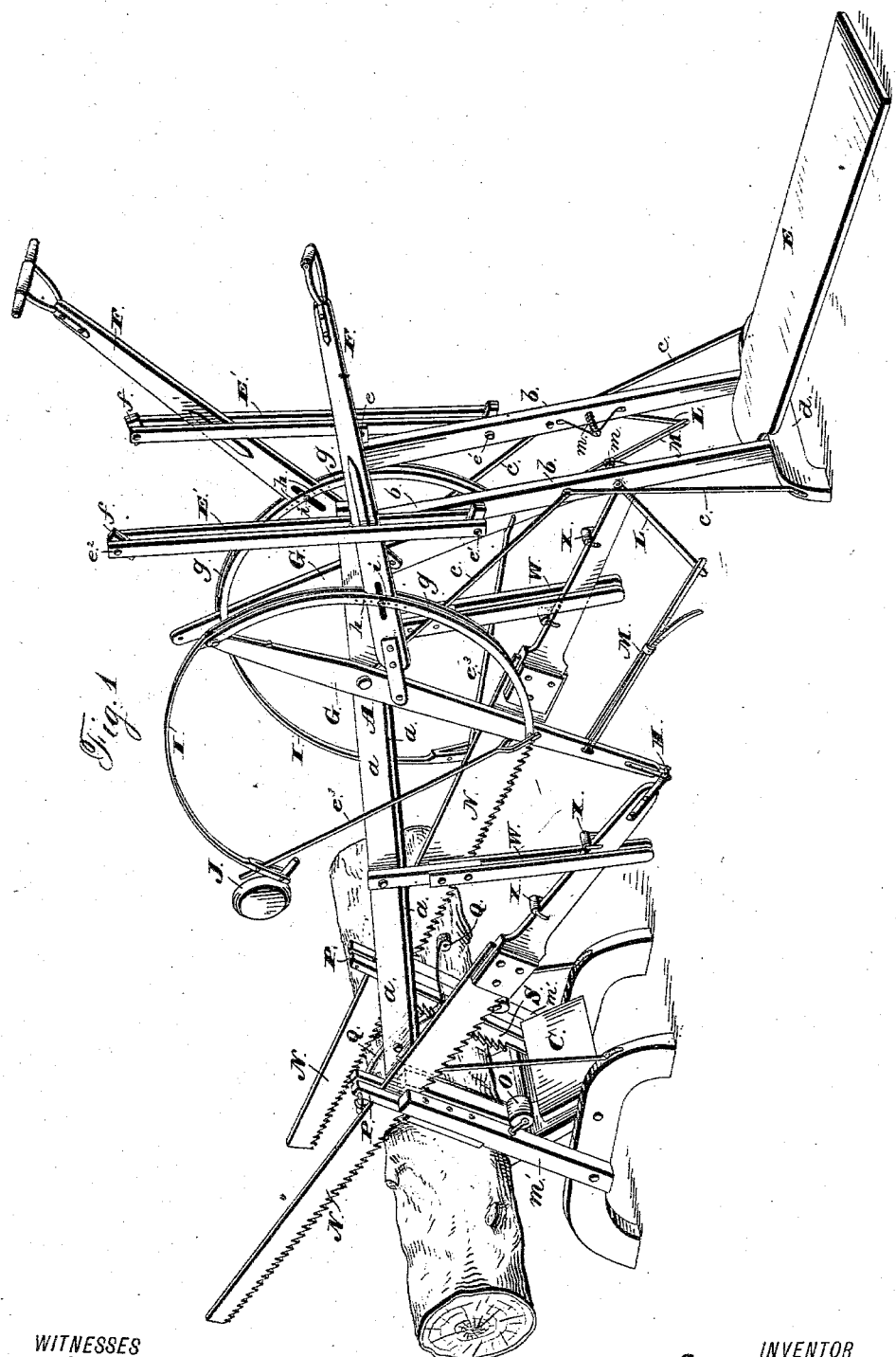

(No Model.) 2 Sheets—Sheet 2.
G. G. SEEGER.
DRAG SAW.
No. 288,264. Patented Nov. 13, 1883.
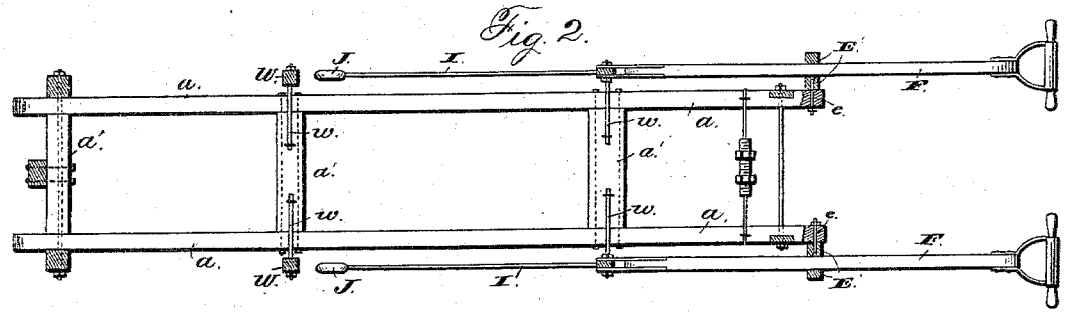
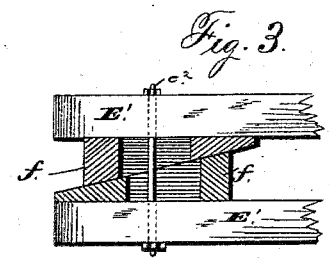
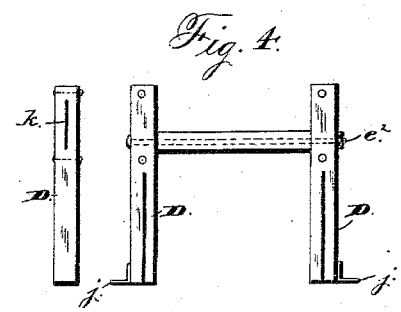
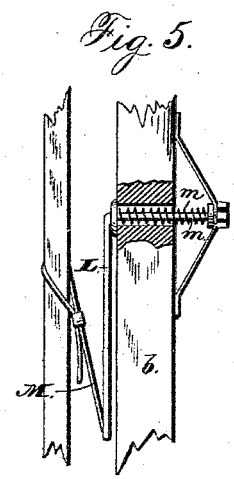
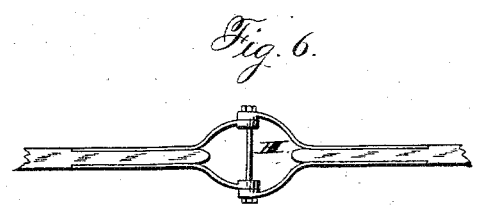
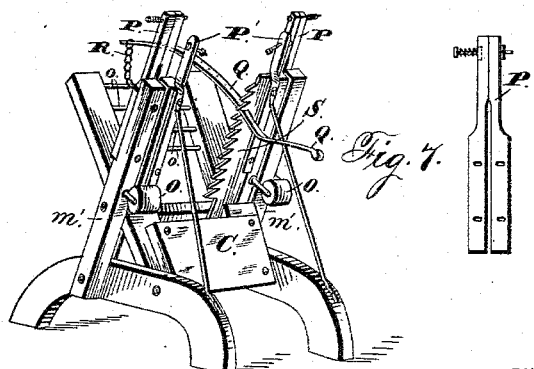
WITNESSES
Jas. E. Hutchinson
Geo. A. Seymour
INVENTOR
G. G. Seeger
By H. A. Seymour
Attorney even if somewhat slow.

UNITED STATES PATENT OFFICE.

GEORG GUSTAV SEEGER, OF HILLSDALE, IOWA.

DRAG-SAW.

SPECIFICATION forming part of Letters Patent No. 288,264, dated November 13, 1883.

Application filed February 20, 1883. (No model.)

*To all whom it may concern:*

Be it known that I, GEORG G. SEEGER, of Hillsdale, in the county of Mills and State of Iowa, have invented certain new and useful Improvements in Drag-Saws; and I do hereby declare the following to be a full, clear, and exact description of the invention, such as will enable others skilled in the art to which it pertains to make and use the same.

My invention relates to an improvement in drag-saws, the object of the same being to combine two saws operated by independent mechanism on one saw-frame, thereby enabling one man to do double the ordinary amount of work without proportionally increasing the cost of the machine; and with these ends in view my invention consists in the parts and combinations of parts, as will be more fully described, and pointed out in the claims.

In the accompanying drawings, Figure 1 is a perspective view of my improvement. Fig. 2 is a plan view of the same, partly in section, with the saw-buck removed. Fig. 3 is an enlarged detached view, showing the manner of adjusting the hand-lever guides. Fig. 4 is a view of the saw-guides adapted to be employed in the place of the saw-buck. Fig. 5 shows an enlarged view of the mechanism for assisting the operator in moving the saws. Fig. 6 is an enlarged view, showing the manner of connecting the saw to the stroke-lever; and Fig. 7 is a perspective view of the saw-buck.

A represents the frame of the machine, which consists of the two parallel side beams, $a$, separated and held in position by the cross-bars $a'$ and the standards $b$, the latter being rigidly secured at their lower ends to the foot $d$. These standards $b$ are rigidly secured at their upper ends to the side beams, $a$, and are further strengthened by the metallic braces $c$. The front or outer ends of the beams $a$ are adapted to be removably secured to the saw-buck C or to the saw-guides D, both of which form supports for the front ends of the beams, as will be hereinafter described.

E is a platform, one end of which is adapted to rest on the front, $d$, of the machine-frame. This platform is situated in the rear of the machine, for the operator to stand on, and assists materially in holding the machine in position.

E' are the handle-guides in which the handles F move, and by which they are prevented from lateral straining. These guides also form the limit of movement of the handles, and are secured to the side beams, $a$, and the standards $b$ by the bolts $e$ and $e'$, respectively. Each bolt $e$ passes through one side piece of the guides, and through the beams $a$, the head of said bolt resting in a countersink in the guide, so as not to interfere with the free movement of the handles, while the other bolt, $e'$, passes through both pieces of the guides and through the standards $b$. The two pieces forming each guide are separated at opposite ends by the adjustable wedge-shaped blocks $f$, which latter are shaped and secured together as shown in Fig. 3. Each block is provided with an oblong slot for the passage of the bolts $e^2$ and $e'$, and also for the purpose of enabling the blocks to be moved lengthwise for the purpose of increasing or diminishing the space between the two pieces forming the guide, as circumstances demand.

The handles F are pivotally secured at their front ends to the stroke-lever G at a point slightly below their fulcrums, and project backward behind the machine a sufficient distance to afford good leverage for the operator. These handles are adjusted relatively to the stroke-levers by means of the curved metal bars $g$, the opposite ends of which are secured to the stroke-levers, respectively, above and below their fulcrums. These bars $g$ are each provided with a series of holes, $h$, which latter register with the oblong slots in each handle for the passage of the bolt $i$.

The handles are adjusted at a position to suit the operator by simply withdrawing the bolts $i$ and moving the handles up or down until the proper position has been reached, and then securing them by the bolts $i$, which latter rigidly secure the handles and stroke-levers together.

The stroke-levers G are secured to the beams $a$ in the position shown, and the lower ends thereof are secured to the saw by the joint or coupling H. These levers project above the beams $a$, and each is provided at its upper end with the forwardly-projecting curved metallic rod I, to the outer ends of which latter the counterbalance-weights J are secured. These weights assist the operator materially in drawing the saws backward after a forward stroke, and are prevented from vibrating by means of the brace-rods $e^3$, which latter connect the outer ends of the curved rods I to the stroke-levers G. The back-stroke of the saws is also aided or assisted by the spring-actuated rods L, which latter are pivotally secured in suitable bearings to the legs or standards $b$. These rods are bent, as shown in Fig. 5, and the horizontal portions thereof are each encircled by a spiral spring, $m$, one end of which is rigidly secured to the leg $b$, or to the rod-supports, while the opposite end thereof is rigidly secured to the rod L. The lower end of the vertical portion of each rod is adjustably connected by a strap, M, to the stroke-lever G at a point below its fulcrum, and the tendency of the spring is to constantly throw the vertical arm of the rod L backward. Thus it will be seen that the operator only exerts a power when driving the saws forward, while the combined action of the weight and spring assists him in making the back-stroke.

The saws N are situated on opposite sides of the frame A, and are operated by independent handles. These handles can be operated simultaneously by one person, either in the same or in opposite directions. They can be worked by two men, one at each handle; or the outer ends of the handles can be locked together by a suitable cross-bar, so as to enable the operator to work with one hand and move both saws simultaneously.

The outer ends of the side beams are, as before stated, adapted to be secured to the guides D or to the saw-buck C. In sawing large heavy logs it is preferable to use the guides D, the lower ends of which latter are adapted to rest on and be secured to the log by simply driving a nail through each outwardly-projecting flange $j$. Each guide D is bolted to the side beams, $a$, by a single bolt, $l$, which latter passes through the oblong slots $k$ in the guides D, through the side beams, and thence through the end cross-bar. These guides are adapted to be adjusted vertically, and can be removed, when desired, by simply withdrawing the bolt $l$.

To hold the inner ends of the saws in position, and to assist in making them run smoothly, I have provided the depending guides W. These guides are secured to the saw-frame by a bolt, $w$, and are free to swing forward and backward as the stops or buffers X strike the same, but are held against lateral movement, and consequently prevent the rear ends of the same from wabbling. The lower ends of these guides are are slotted for the reception of the inner ends of the saws.

The saw-buck C can be made of any desired size and of the ordinary shape, and the outside or rear standards, $m'$, are provided with open slots, in which the saws move. These standards are provided at the lower ends of the said slots with the rollers O, on which the saws rest after passing through the wood, and are also provided on their opposite faces with the two-part spring-actuated guides P, which latter hold the saws in position. Each guide P consists of two parts secured together at their upper end by a bolt. A spring also encircles the portion of the bolt to one side of the guide, and is retained in position by a nut. A portion of the inner face of the two parts composing each guide is cut away, forming a slit in which the saw works, and by continued sawing this slit becomes enlarged, so that when the saw is started to make a new cut it has too much play and will make an angling or diagonal cut across the log, which will (as the frame is bolted to the log or saw-buck and not allowed any lateral movement) cause the saw to pinch. When this takes place, the guides are removed and the straight bearing-faces thereof slightly cut away or planed off, so as to diminish the width of the slit. The guides are then again secured in position by the bolts in the ordinary manner. The saw-buck is also provided with the two metal plates P', firmly secured in position, and provided at their upper end with bolt-holes adapted to register with the transverse holes in the front ends of the beams $a$ when the guides D are removed. When the parts are thus placed, they are then secured together by two small bolts, as shown in Fig. 1.

The saw-buck is provided with a series of cross-bars, $o$, to any one of which the swiveled chain R can be removably secured, so as to accommodate the spring-metal bar Q to the size of the log to be sawed. This bar is secured to the free end of the chain, and is adapted to extend over the wood and be locked under the serrated or toothed plate S, secured to one leg of the saw-buck.

This machine is especially adapted for cutting fire-wood, and the saws are separated just the length of the cut log; but, if desired to use it for other purposes, one of the saws can be detached without any trouble whatever.

My machine is simple in construction, is durable in use, and can be manufactured at a small initial cost.

It is evident that slight changes in the construction and relative arrangement of the several parts might be resorted to without departing from the spirit of my invention, and hence I would have it understood that I do not limit myself to the exact forms shown and described, but consider myself at liberty to make such changes and alterations as fairly fall within the spirit and scope of my invention.

Having fully described my invention, what I claim as new, and desire to secure by Letters Patent, is—

1. In a drag-saw, the combination, with a frame, of saws secured to the opposite sides thereof, and mechanism capable of being connected and disconnected for moving the saws independently of each other.

2. The combination, with the side beams supported on standards, the foot secured to the lower ends of the standards, and the platform, one end of which rests on the foot, of two saws situated on opposite sides of the frame, and mechanism for moving them independently of each other, the said mechanism consisting, essentially, of the independent respective sets of operating pivoted hand and stroke levers, their guides, and minor connecting devices, substantially as shown and described.

3. The combination, with the side beams, standards $a$, stroke-lever pivoted to one side beam, and a saw secured to the end of the stroke-lever, of a handle adjustably secured to the stroke-lever, the said stroke-lever and handle being provided with a spring-actuated return-rod and counterbalance-weight, whereby the return-stroke of the saw is facilitated, substantially as shown and described.

4. The combination, with the machine-frame, the stroke-bars pivoted thereto, connected to the spring-actuated rod, and provided with a curved rod having a counterbalance-weight secured thereto, whereby the return-stroke is aided, and the curved bars having a series of holes therein, of the handles pivoted to the stroke-levers, and adjustably secured in one of the series of holes in the curved bars by removable bolts, substantially as shown and described.

5. The combination, in a drag-saw, of the pivoted stroke-bars, having curved metal bars secured thereto, curved arms having weights and brace-rods, with the handles pivotally secured to the stroke-levers and adjustably pivoted between the curved metal bars, the respective sets of hand-levers and stroke-bars being adapted to have an independent movement, substantially as described.

6. The combination, with a suitable machine, a stroke-lever secured thereto, and a saw secured to the stroke-lever, of a handle and adjustable handle-guides adapted to be laterally adjusted toward the handle, whereby lost motion occasioned by wearing is prevented, substantially as described.

7. The combination, with a suitable frame, a stroke-lever pivoted thereto, and a handle and saw secured to the said stroke-lever, of the spring-actuated bar secured to one leg of the frame, and connected to the stroke-lever below its fulcrum by an adjustable strap.

8. The combination, with the frame, a stroke-lever pivoted thereto, a counterbalance-weight secured to the stroke-lever above the fulcrum, a spring-actuated bar secured to one leg of the frame, and connected by an adjustable strap to the stroke-bar below its fulcrum, of a handle adjustably secured to the stroke-lever.

9. The combination, with a suitable frame, double saws, and mechanism, constructed substantially as described, for moving the saws independently of each other, of a saw-buck removably secured to the outer ends of the side beams of the frame, and provided with adjustable guides for the saws.

10. The combination, with a suitable double drag-saw, of a saw-buck removably secured to the frame thereof, having saw-guides formed therein, and rollers journaled below the guides and adapted to support the saws, for the purpose set forth.

11. The combination, with a suitable drag-saw, of the saw-buck secured to the front end of the frame thereof, and having its rear legs provided with slits for the saws to move in, with the removable two-part adjustable saw-guides secured to the said legs, substantially as set forth.

12. The combination, with a suitable drag-saw, of the saw-buck provided with the saw-guide, the roller, the spring-metal bar, and the toothed plate, all of the above parts combined and adapted to operate as described.

In testimony whereof I have signed this specification in the presence of two subscribing witnesses.

GEORG GUSTAV SEEGER.

Witnesses:
J. R. WAY,
R. T. PHILLIPS.